United States Patent [19]
Pudelski et al.

[11] Patent Number: 5,366,055
[45] Date of Patent: Nov. 22, 1994

[54] COUPLING ASSEMBLY COMPONENT

[75] Inventors: Karen L. Pudelski, Bedford, Ohio; Joseph W. Lowry, Laurinburg, N.C.; Thomas W. Thompson, Westlake, Ohio; Robert A. Pearl, Brunswick, Ohio; Paul H. Elphingstone, Lakewood, Ohio; Mars Patterson, Cleveland, Ohio; Theodore C. Kelly, North Olmsted, Ohio

[73] Assignee: Eaton Corporation, Cleveland, Ohio

[21] Appl. No.: 41,570

[22] Filed: Apr. 2, 1993

[51] Int. Cl.$^5$ ............................................ F16D 25/04
[52] U.S. Cl. .................... 192/88 B; 192/85 AT; 188/366
[58] Field of Search ............. 192/85 AT, 88 R, 88 A, 192/88 B; 188/365, 366, 367

[56]  References Cited
U.S. PATENT DOCUMENTS

| 2,630,198 | 3/1953 | Kraft | 192/88 B |
| 2,897,924 | 8/1959 | Fawick | |
| 3,362,733 | 1/1968 | Klara | 182/88 B X |
| 4,773,519 | 9/1988 | Candle et al. | 192/88 A |
| 5,057,178 | 10/1991 | Latsko | |
| 5,086,899 | 2/1992 | Latsko | |

Primary Examiner—Richard M. Lorence
Attorney, Agent, or Firm—Tarolli, Sundheim & Covell

[57] ABSTRACT

A coupling assembly component includes an annular base. A first annular friction surface is connected with the base and is movable into engagement with a second annular friction surface. An annular fluid extensible tube is inflatable to move the first friction surface into engagement with the second friction surface. A fitting is connected with the base and the tube to conduct fluid pressure into a chamber in the tube. An annular mounting ring is disposed in a coaxial relationship with the base and the tube. The annular mounting ring is embedded in the tube and is connected with a portion of the fitting. The annular mounting ring may be provided with only a single opening which is connected with a fitting through which fluid is conducted into the tube. However, the annular mounting ring may be provided with a plurality of openings connected with a plurality of fittings.

6 Claims, 1 Drawing Sheet

COUPLING ASSEMBLY COMPONENT

BACKGROUND OF THE INVENTION

The present invention relates to a new and improved component of a coupling assembly which may function as either a clutch or a brake between a pair of elements.

Known coupling assemblies which are used as either a clutch or a brake are disclosed in U.S. Pat. Nos. 2,897,924; 5,057,178; and 5,086,899. Each of these coupling assemblies includes an annular rim or base which is connected to one of two elements between which force is transmitted. An annular array of friction shoes is engageable with a friction surface connected with the other element. An annular fluid extensible tube is disposed between the base and the annular array of friction shoes. A fitting is connected with the base and tube to enable fluid pressure to be conducted into an annular chamber in the tube.

The fitting through which fluid pressure is conducted to the cheer in the tube may be molded into the material of the tube. The number of fittings for a given coupling assembly is determined by the design of the particular coupling assembly and cannot be easily changed after manufacture of the coupling assembly. If a coupling assembly design requires more than the normal or standard number of fittings, the coupling assembly must be manufactured to order. Of course, this increases the expense of manufacturing the coupling assembly.

SUMMARY OF THE INVENTION

The present invention provides a coupling assembly component for use in transmitting force between a pair of elements. The coupling assembly component includes an annular rim or base which is adapted to be connected with one of the elements. A first annular friction surface is coaxial with the base and is movable into engagement with a second annular friction surface connected with the second element. An annular fluid extensible tube is coaxial with the base. The tube is radially extensible under the influence of fluid pressure to move the first friction surface into engagement with the second friction surface. A fitting is provided to conduct fluid pressure into the tube.

In accordance with a feature of the invention, an annular mounting ring is coaxial with the base and is embedded in the tube. A portion of the fitting is connected with the annular mounting ring. Fluid is conducted under pressure through the fitting and the annular mounting ring into a chamber in the tube to inflate the tube.

In one embodiment of the invention, the annular mounting ring was formed with a single opening through which fluid was conducted from a single fitting into the tube. In another embodiment of the invention, the annular mounting ring was formed with a plurality of openings. When this embodiment of the mounting ring is used with a coupling component having only a single fitting through which fluid is conducted into the tube, openings in the annular mounting ring other than the opening connected with the single fitting are filled with the material forming the tube. Of course, if the coupling component has a plurality of fittings, each of the fittings would be associated with one of the openings in the annular mounting ring to enable fluid to be conducted into the tube at a plurality of locations.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

Figure 1:
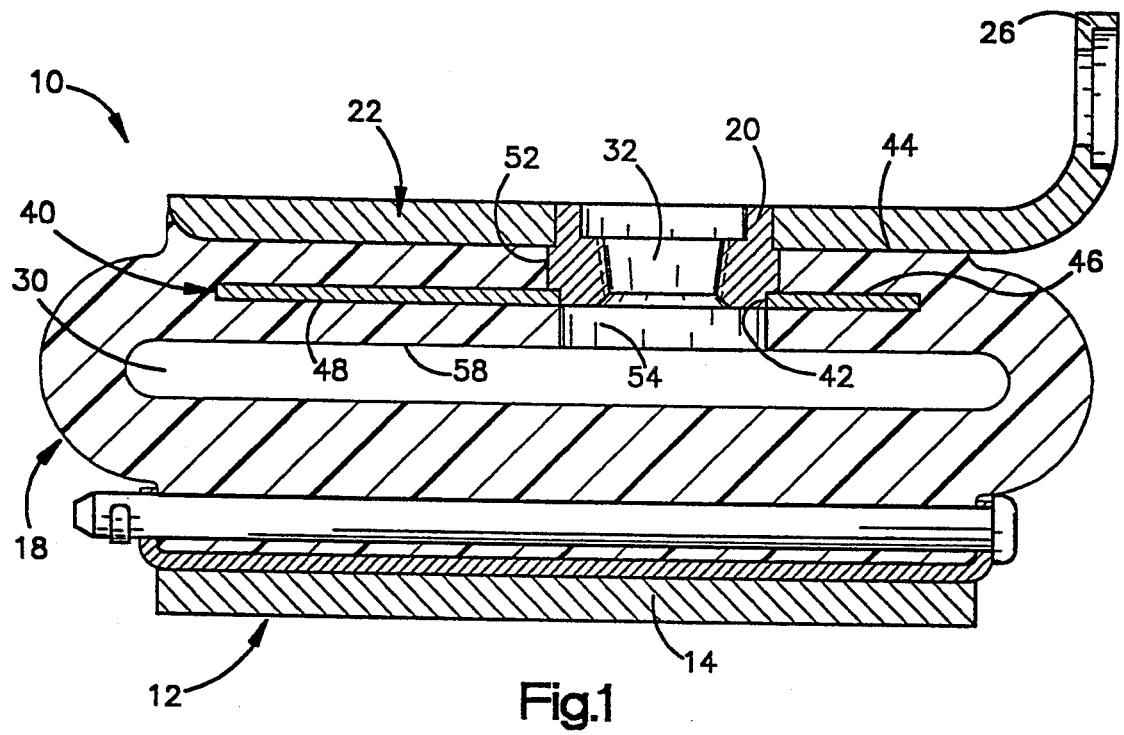
FIG. 1 is a sectional view of a coupling component constructed in accordance with the present invention and illustrating the relationship between a base, a fluid extensible tube, an annular array of friction shoes, and a mounting ring through which fluid is conducted into a chamber in the tube.

A coupling component 10 (FIG. 1) constructed in accordance with the present invention includes an annular friction surface 12 formed by an annular array of friction shoe assemblies 14. The friction shoe assemblies 14 are engageable with the outside of a cylindrical drum or second coupling component (not shown) to interconnect the two coupling components. The coupling component 10 could function as part of either a brake or a clutch.

The friction shoe assemblies 14 are moved into engagement with the drum by radial expansion of an annular inflatable tube 18. Thus, when fluid pressure, such as air pressure, is conducted through a metal fitting 20 into the annular tube 18, the tube expands radially inwardly. This causes the tube 18 to press the friction shoe assemblies 14 against a cylindrical outer side surface of the drum. The friction between the shoe assemblies 14 and the drum interconnect the drum and the coupling component 10.

In the illustrated embodiment of the invention, friction shoe assemblies 14 are pressed against the outside of a cylindrical dry. However, it is contemplated that the coupling assembly component 10 could be designed in such a manner as to press the friction shoe assemblies 14 against a cylindrical inner side surface of a hollow drum.

A rigid annular metal rim or base 22 is connected with the inflatable tube 18. The rim or base 22 has an annular mounting flange 26 which is used to connect the coupling component 10 with an associated apparatus. In the illustrated embodiment of the invention, the inflatable tube 18 is secured directly to the rim 22 and friction shoe assemblies 14. However, the inflatable tube 18 could be separate from the rim 22 and friction shoe assemblies 14. If this was done, a suitable frame would be provided to position the rim 22, friction shoe assemblies 14 and tube 18 relative to each other.

Upon inflation of the tube 18, the friction shoe assemblies 14 are moved radially inwardly away from the rim 22 and pressed against the drum. At this time, the tube 18 transmits force between the friction shoe assemblies 14 and the rim 22. As was previously mentioned, the coupling assembly component 10 could be designed so as to move the friction shoe assemblies 14 radially outwardly to engage the inside of a hollow drum or second coupling component if desired.

To enable the tube 18 to be inflated, the tube has an annular inner chamber or cavity 30. The chamber or cavity 30 is connected in fluid communication with a source of fluid pressure (air) through the fitting 20. The fitting 20 is fixedly connected to the annular rim 22 and is connected in fluid communication with the annular chamber 30 through a passage 32 which extends radially through the rim 22 and a portion of the tube 18. Although the coupling component 10 could be formed in many different ways, it is believed that it may be preferred to form the coupling component assembly 10 in the manner described in U.S. Pat. No. 5,057,178.

In accordance with a feature of the present invention, an annular mounting ring 40 (FIG. 1) is provided between and in a coaxial relationship with the rim 22 and the annular array of friction shoe assemblies 14. The annular mounting ring 40 is formed of steel. However, the mounting ring 40 could be formed of other materials, such as fiberglass, plastic or brass. The mounting ring 40 is embedded in elastomeric material forming the tube 18. A radially inner end portion of the fitting 20 is connected with a circular and radially extending opening formed in the mounting ring 40.

The fitting 20 extends radially outwardly from the mounting ring 40 through the material of the tube 18 into engagement with the annular rim or base 22. Therefore, opposite end portions of the fitting 20 are firmly supported. Thus, the radially outer end portion of the fitting 20 is supported by engagement with the rim 22. The radially inner end portion of the fitting 20 is supported by engagement with the annular mounting ring 40.

In the illustrated embodiment of the invention, the rim or base 22 has a cylindrical radially inwardly facing side surface 44 which is disposed in a coaxial relationship with a cylindrical and radially outwardly facing side surface 46 of the mounting ring 40 and the chamber 30. The fitting 20 extends through the annular space between the side surfaces 44 and 46 of the rian 22 and mounting ring 40. The space between the coaxial cylindrical side surfaces 44 and 46 of the rim 22 and mounting ring 40 is constant throughout the extent of the base and mounting ring.

The tube 18 is formed of elastomeric material. The elastomeric material of the tube 18 is bonded to the radially inwardly facing side surface 44 of the rim or base 22. The elastomeric material of the tube 18 is also bonded to the radially outwardly facing cylindrical side surface 46 of the mounting ring 40 and to a radially inwardly facing cylindrical side surface 48 of the mounting ring.

The fitting 20 has a cylindrical central portion 52 which extends radially outwardly of the fitting to form a pair of annular shoulders. The axially inner shoulder on the fitting 20 abuttingly engages the mounting ring 40. The axially outer shoulder on the fitting 20 abuttingly engages the rian or base 22. The elastomeric material of the tube 18 is bonded to the outer side surface of the cylindrical portion of the fitting disposed between the base 22 and the mounting ring 40.

The passage 32 foraged in the fitting 20 extends axially through the fitting and through the cylindrical opening 42 formed in the mounting ring 40. A cylindrical opening 54 is formed in the elastomeric material of the tube and extends radially inwardly from the fitting 20 to the chamber 30. If desired, the fitting 20 could extend completely through both the mounting ring 40 and elastomeric material of the tube 18 into the chamber 30.

In the embodiment of the invention illustrated in FIG. 1, there is only a single opening 42 formed in the mounting ring 40. Thus, with the exception of the circular opening 42, the radially outer side surface 46 and radially inner side surface 48 of the mounting ring 40 are continuous and free of perforations. If it is desired to add another fitting 20 to the coupling component 10 to facilitate the conducting of fluid into and/or out of the chamber 30, a hole would be drilled, cut, or otherwise formed through the rim 22, mounting ring 40 and the elastomeric material of the tube 18 disposed between a cylindrical radially outer side 58 of the chamber 30 and the mounting ring 22. A second fitting would then be mounted on the rim 22 and the mounting ring 40.

Since the mounting ring 40 has a relatively rigid construction, axially opposite end portions of the fitting 20 are firmly supported. Thus, the radially outer end portion of the fitting 20 is supported by the rim 22. The radially inner portion of the fitting 20 is supported by the mounting ring 40. In the embodiment of the invention illustrated in FIG. 1, the fitting 20 is secured to the rim 22 and mounting ring 40 by welding and/or by mechanical interference fit between the fitting and the rim and the mounting ring. However, it is contemplated that both the rim or base 22 and the mounting ring 40 could be tapped to have internal threads which would engage external threads formed on the fitting 20.

Figure 2:
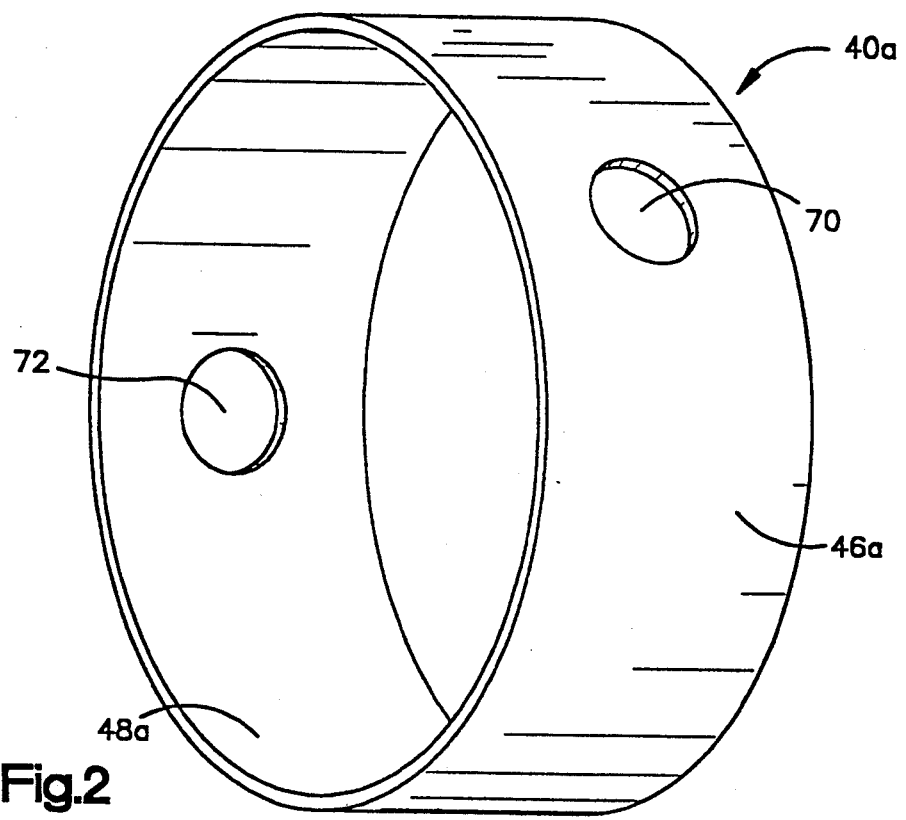
FIG. 2 is pictorial illustration of a second embodiment of the mounting ring and illustrating the relationship between a plurality of openings formed in the mounting ring.

In the embodiment of the invention illustrated in FIG. 1, a single opening 42 is formed in the mounting ring 40 to receive a single fitting 20. It is contemplated that it may be desired to provide a coupling component with a plurality of fittings through which fluid is conducted to and from the chamber 30 in the tube. In the embodiment of the invention illustrated in FIG. 2, a plurality of openings are formed in the mounting ring to facilitate the mounting of a plurality of fittings to conduct fluid to and from the chamber in the tube. Since the embodiment of the invention illustrated in FIG. 2 is generally similar to the embodiment of the invention illustrated in FIG. 1, similar numerals will be utilized to designate similar components, the suffix letter "a" being associated with the embodiment of the invention illustrated in FIG. 2 to avoid confusion.

An annular mounting ring 40a is provided with a plurality of radially extending openings 70 and 72. Although only two openings 70 and 72 have been shown, it is contemplated that a greater number of openings could be provided if desired. The openings 70 and 72 extend between a cylindrical outer side surface 46a of the mounting ring 40a and a cylindrical inner side surface 48a of the mounting ring.

The openings 70 and 72 enable a plurality of fittings, corresponding to the fitting 20 of FIG. 1, to be mounted in association with a coupling component. If only one fitting is desired, as shown in FIG. 1, the fitting would be connected with the opening 70 in the same manner as in which the fitting 20 is connected with the opening 42 in FIG. 1. The opening 72 and any additional openings in the mounting ring 40a of FIG. 2, would be filled with the elastomeric material of the tube 18 when the mounting ring is embedded or molded into the tube. If it was subsequently desired to provide a second fitting in association with the coupling component, it would be merely necessary to remove the elastomeric material filling the opening 72 and to mount a second fitting in association with the opening 72.

Although only a pair of openings 70 and 72 have been shown in the mounting ring 40a at diametrically opposite locations in the mounting ring, it is contemplated that additional openings could be provided at additional locations in the mounting ring if desired. It is contemplated that the openings 70 and 72 may be tapped to provide internal threads to engage external threads on the fittings. Of course, the number of fittings 20 associated with a particular coupling component could be equal to or less than the number of openings formed in the mounting ring 40a.

The annular tube 18 may be formed separately from the rim 22 as a single piece with a radially extending slit. It is also contemplated that the annular tube 18 may be formed as a plurality of segments which are subsequently interconnected. Thus, tube 18 may be formed as two, three or more segments which have separate chambers for holding air. The tube segments may be retained in an annular frame or mounting structure without being secured directly to either the friction shoe assemblies or the frame.

The mounting ring 40 may be followed as a single piece which has a radial extent of less than 360°. For example, the mounting member 40 could be formed as a piece having a circumferential extent along the tube 18 of approximately 15°. However, the mounting ring 40 could be formed by a plurality of pieces, each of which has an arcuate extent of less than 360°. For example, the mounting ring 40 could be formed by six pieces having an arcuate extent of 40° each. The six pieces could be positioned in a circular array with the six pieces spaced equal distances apart.

In view of the foregoing description, it is apparent that the present invention provides a new and improved coupling assembly component 10 for use in transmitting force between a pair of elements. The coupling assembly component 10 includes an annular rim or base 22 which is adapted to be connected with one of the elements. A first annular friction surface 12 is coaxial with the base and is movable into engagement with a second annular friction surface connected with the second element. An annular fluid extensible tube 18 is coaxial with the base 22. The tube 18 is radially extensible under the influence of fluid pressure to move the first friction surface 12 into engagement with the second friction surface. A fitting 20 is provided to conduct fluid pressure into the tube.

In accordance with a feature of the invention, an annular mounting ring 40 is coaxial with the base 22 and is embedded in the tube 18. A portion of the fitting 20 is connected with the annular mounting ring 40. Fluid is conducted under pressure through the fitting 20 and the annular mounting ring 40 into a chamber 30 in the tube 18 to inflate the tube.

In one embodiment of the invention (FIG. 1), the annular mounting ring 40 was formed with a single opening 42 through which fluid was conducted from a single fitting into the tube. In another embodiment of the invention (FIG. 2), the annular mounting ring 40a was formed with a plurality of openings 70 and 72. When the mounting ring 40a is used with a coupling component having only a single fitting through which fluid is conducted into the tube, openings in the annular mounting ring 40a other than the opening connected with the single fitting are filled with the material forming the tube. Of course, if the coupling component has a plurality of fittings, each of the fittings would be associated with one of the openings in the annular mounting ring to enable fluid to be conducted into the tube at a plurality of locations.

Having described the invention, the following is claimed:

1. A coupling assembly component for use in transmitting force between first and second elements, said coupling assembly component comprising an annular base adapted to be connected with the first element, a first annular friction surface which is coaxial with said base and is movable relative to said base, annular fluid extensible tube means which is coaxial with said base and is radially extensible under the influence of fluid pressure in said tube means to move said first friction surface relative to said base, fitting means for conducting fluid pressure into said tube means, and annular mounting ring means coaxial with said base and said tube means, said annular mounting ring means being embedded in said tube means and connected with a portion of said fitting means, said mounting ring means including first surface means for defining a first opening which extends through said mounting ring means and is engaged by said fitting means and second surface means for defining a second opening which extends through said mounting ring means and is spaced from said first opening in a circumferential direction along an outer side surface of said mounting ring means, said second opening being filled by a portion of said tube means.

2. A coupling assembly component as set forth in claim 1 wherein said base has a cylindrical side surface which is connected with said tube means, said annular mounting ring means including a cylindrical side surface which faces toward and is spaced apart from the cylindrical side surface of said base, a portion of said tube means being disposed between said cylindrical side surface of said base and said cylindrical side surface of said mounting ring means, said fitting means extending through the portion of said tube means disposed between said cylindrical side surface of said base and said cylindrical side surface of said mounting ring means, a first portion of said fitting means being connected with said base and a second portion of said fitting means being connected with said mounting ring means.

3. A coupling assembly component as set forth in claim 2 wherein said tube means is formed of elastomeric material which is bonded to said cylindrical side surface of said base, said cylindrical side surface of said mounting ring means and to a portion of said fitting means disposed between said first and second portions of said fitting means.

4. A coupling assembly component as set forth in claim 1 wherein said fitting means includes only a single fitting which extends from said base through a portion of said tube means to said mounting ring means.

5. A coupling assembly component as set forth in claim 1 wherein said tube means includes surface means for defining an annular chamber which is coaxial with said base and disposed between said mounting ring means and said first annular friction surface, said fitting means being connected in fluid communication with said annular chamber through said mounting ring means.

6. A coupling assembly component for use in a coupling assembly having an annular base adapted to be connected with a first element and a first annular friction surface which is coaxial with said base and is movable into engagement with a second annular friction surface connected with a second element, said coupling assembly component comprising annular fluid extensible tube means which is extensible under the influence of fluid pressure in a chamber in said tube means to move the first friction surface into engagement with the second friction surface, and annular mounting ring means coaxial with and embedded in said tube means for at least partially supporting a fitting through which fluid is conducted into the chamber in said tube means, said mounting ring means including first surface means for defining a first opening which extends through said mounting ring means and is engaged by the fitting and second surface means for defining a second opening which extends through said mounting ring means and is spaced from said first opening in a circumferential direction along an outer side surface of said mounting ring means, said second opening being filled by a portion of said tube means.

* * * * *